United States Patent
Shin et al.

(10) Patent No.: US 11,841,713 B2
(45) Date of Patent: Dec. 12, 2023

(54) CONTROLLERS AND AIRCRAFT WITH TAKEOFF STALL PROTECTION SYSTEM

(71) Applicant: Gulfstream Aerospace Corporation, Savannah, GA (US)

(72) Inventors: Jong-Yeob Shin, Savannah, GA (US); Gi-Yun Chung, Savannah, GA (US); Lakmal Kaviratna, Savannah, GA (US)

(73) Assignee: Gulfstream Aerospace Corporation

( * ) Notice: Subject to any disclaimer, the term of this patent is extended or adjusted under 35 U.S.C. 154(b) by 48 days.

(21) Appl. No.: 16/736,036

(22) Filed: Jan. 7, 2020

(65) Prior Publication Data
US 2021/0206476 A1 Jul. 8, 2021

(51) Int. Cl.
*G05D 1/08* (2006.01)
*B64C 13/16* (2006.01)
(Continued)

(52) U.S. Cl.
CPC .............. *G05D 1/0833* (2013.01); *B64C 9/00* (2013.01); *B64C 13/0421* (2018.01);
(Continued)

(58) Field of Classification Search
CPC .. G05D 1/0066; G05D 1/0607; G05D 1/0661; G05D 1/0808; G05D 1/0816;
(Continued)

(56) References Cited

U.S. PATENT DOCUMENTS 3,037,725 A * 6/1962 Treffeisen .............. B64D 43/02
244/181
3,659,173 A * 4/1972 Pfersch ................ G05D 1/0066
318/584
(Continued)

OTHER PUBLICATIONS

Sankrithi, Mithra M. K. V. et al., "7J7 manual flight control functions", AIAA Paper 87-2454, 1987 Guidance, Navigation and Control Conference (MGNC87), Aug. 17, 1987-Aug. 19, 1987, Monterey, CA, U.S.A., pp. 905 to 913 (Year: 1987).*
(Continued)

*Primary Examiner* — David A Testardi
(74) *Attorney, Agent, or Firm* — LKGlobal | Lorenz & Kopf, LLP

(57) ABSTRACT

Flight control systems, flight control laws, and aircraft are provided. An flight control system includes an input configured to receive a pitch rate command, a processor operative to receive the pitch angle command, to calculate a pitch angle saturation limit, to compare the sum of the pitch rate command, the scaled pitch rate, and the scaled pitch angle to the pitch angle saturation limit, to convert the pitch rate command system to the pitch angle command system in response to the sum exceeding the pitch angle saturation limit value to limit the pilot pitch-up pitch rate command, and to couple the pitch rate command to an aircraft control surface for the failure case of one of control surface, and the aircraft control surface configured to adjust an aircraft control surface setting in response to the pitch rate command and/or pitch angle command to protect an aircraft from being in stall condition.

20 Claims, 3 Drawing Sheets

(51) Int. Cl.
- *B64C 13/04* (2006.01)
- *B64C 9/00* (2006.01)
- *B64C 13/26* (2006.01)
- *B64D 43/02* (2006.01)

(52) U.S. Cl.
CPC .............. *B64C 13/16* (2013.01); *B64C 13/26* (2013.01); *B64D 43/02* (2013.01); *G05D 1/0808* (2013.01); *G05D 1/0816* (2013.01)

(58) Field of Classification Search
CPC .... G05D 1/0825; G05D 1/0833; B64C 13/16; B64C 13/0421; B64C 13/26; B64C 13/506; B64D 43/02; B64D 31/02; B64D 31/06; G01C 23/005
See application file for complete search history.

(56) References Cited

U.S. PATENT DOCUMENTS

| | | | | |
|---|---|---|---|---|
| 3,839,699 | A * | 10/1974 | Heinsohn | G08G 5/0052 340/966 |
| 3,945,590 | A * | 3/1976 | Kennedy, Jr. | G05D 1/0661 244/181 |
| 4,347,572 | A * | 8/1982 | Berwick, Jr. | G05D 1/0661 244/181 |
| 4,787,042 | A * | 11/1988 | Burns | G05D 1/0066 244/181 |
| 4,797,674 | A * | 1/1989 | Zweifel | G05D 1/0623 244/181 |
| 4,829,220 | A * | 5/1989 | Fabre | G05D 1/0607 318/584 |
| 4,841,448 | A * | 6/1989 | Ford | G05D 1/0623 244/181 |
| 4,910,513 | A * | 3/1990 | Kelly | G01C 23/005 340/966 |
| 5,136,518 | A * | 8/1992 | Glover | G05D 1/0623 244/181 |
| 5,722,620 | A * | 3/1998 | Najmabadi | G05D 1/0816 701/16 |
| 5,803,408 | A * | 9/1998 | Gast | G05D 1/0607 701/14 |
| 5,979,835 | A * | 11/1999 | Najmabadi | G05D 1/0833 701/8 |
| 10,302,451 | B1 * | 5/2019 | Kim | G01P 13/025 |
| 11,299,289 | B1 * | 4/2022 | Derstein | B64D 43/02 |
| 2009/0062973 | A1 * | 3/2009 | Caldeira | G05D 1/0833 701/6 |
| 2009/0171518 | A1 | 7/2009 | Yamane et al. | |
| 2014/0156116 | A1 * | 6/2014 | Nelson | G01C 23/00 701/14 |
| 2014/0253348 | A1 * | 9/2014 | Maeda | B64D 43/02 340/966 |
| 2014/0365042 | A1 * | 12/2014 | D' Alto | B64C 19/00 701/12 |
| 2015/0084792 | A1 * | 3/2015 | Barth | G01D 7/02 340/966 |
| 2016/0152323 | A1 * | 6/2016 | Claffy | B64C 13/503 701/11 |
| 2016/0347469 | A1 * | 12/2016 | Welsh | G05D 1/0816 |
| 2017/0060141 | A1 * | 3/2017 | Leopold | G05D 1/0825 |
| 2017/0113786 | A1 * | 4/2017 | Beaufrere | B64C 13/506 |
| 2017/0139425 | A1 * | 5/2017 | Miranda De Souza | B64D 43/02 |
| 2018/0088593 | A1 * | 3/2018 | De Tarso Ferreira | B64C 13/503 |
| 2019/0003853 | A1 * | 1/2019 | Tremblay | G08G 5/0065 |
| 2020/0066171 | A1 * | 2/2020 | Prosser | G08G 5/0086 |
| 2021/0072769 | A1 * | 3/2021 | Flanzer | G05D 1/0623 244/181 |

OTHER PUBLICATIONS

Zavatson, C., "Critical angle of attack-the rest of the story", Jan. 8, 2017, 5 pages, downloaded from http://www.n91cz.net/AOA/AoA_Article_Web.pdf (Year: 2017).*

Kish, Brian A., "FAA part 23 methods of compliance for AOA warning limiting systems", 2018 IEEE Aerospace Conference, Date of Conference: Mar. 3-10, 2018, 13 pages (Year: 2018).*

Winslow, Justin et al., "Basic understanding of airfoil characteristics at low Reynolds numbers", Journal of Aircraft, vol. 55 No. 3, May-Jun. 2018, pp. 1050 1061. (Year: 2018).*

Cook, R.H., "An automatic stall prevention control for supersonic fighter aircraft", Journal of Aircraft, vol. 2 No. 3, May-Jun. 1965, pp. 171-175 (Year: 1965).*

Iloputaife, Obi I, "Design of deep stall protection for the C-17A", Journal if Guidance, Control, and Dynamics, vol. 20 No. 4, Jul.-Aug. 1997, pp. 760-767. (Year: 1997).*

* cited by examiner

CONTROLLERS AND AIRCRAFT WITH TAKEOFF STALL PROTECTION SYSTEM

TECHNICAL FIELD

The technical field relates generally to takeoff stall protection systems for aircraft, and more particularly relates to flight control systems, flight controller algorithms, and aircraft with a pitch rate command system with pitch angle target limiting function to protect an aircraft from aerodynamic stall on-ground which transitions to a conventional in-air control law after lift-off.

BACKGROUND

During takeoff of an airplane, the pilot must accurately rotate the airplane to a pitch attitude target without under or over-rotating. Accurate rotation achieves optimal take-off field performance and promotes safety and comfort of the passengers and crew. A conventional direct-gain pitch controller paired with a small-displacement control inceptor such as a side-stick, can result in the tendency for a pilot to over-rotate the airplane during takeoff, presenting a real risk of aerodynamic stall before any in-air stall protection control law can be activated and protect the airplane. Decreasing the control authority or increasing the inceptor control forces to prevent this tendency is undesirable since it would reduce the ability to overcome stabilizer mis-trims or control surface jams. Furthermore, providing stall protection in the takeoff phase requires knowledge of the height above the ground due to changes in aerodynamics in the presence of the ground to provide adequate protection without being overly conservative and impacting performance.

As such, it is desirable to provide flight systems, flight control algorithms, and aircraft that provide improved takeoff stall protection across pitch and flight path-based flight tasks. In addition, other desirable features and characteristics will become apparent from the subsequent summary and detailed description, and the appended claims, taken in conjunction with the accompanying drawings and this background.

SUMMARY

Disclosed herein are flight control systems, flight control algorithms, aircraft and related control logic for provisioning aircraft, methods for making and methods for operating such systems, and other vehicles equipped with onboard control systems. By way of example, and not limitation, there is presented an aircraft with takeoff stall protection systems and control systems.

In a first non-limiting embodiment, an flight control system includes, but is not limited to an input configured to generate a pitch rate command in response to a pilot input, a processor operative to receive the pitch angle command, to calculate a pitch angle saturation limit, to compare the pitch angle command to the pitch angle saturation limit, to apply a factor to the pitch angle command in response to the pitch angle command exceeding the pitch angle saturation limit to generate a damped pitch rate command, and to couple the damped pitch rate command to an aircraft control surface, and the aircraft control surface configured to adjust an aircraft control surface setting in response to damped pitch rate.

In accordance with another aspect of the present disclosure, a method for controlling an aircraft including receiving an aircraft speed from an aircraft speed sensor, determining a pitch angle saturation limit in response to the aircraft speed, receiving a pitch rate command from an aircraft control system, generating a pitch angle command in response to the sum of the pitch rate command, scaled pitch rate, and scaled pitch attitude angle exceeding the pitch angle saturation limit, and coupling the pitch angle command same as the pitch saturation limit to an aircraft control surface.

In accordance with another aspect of the present disclosure, an aircraft including an aircraft control handle configured to receive control movements for attitude adjustment in the aircraft and to generate a pitch angle command in response to the control movements for attitude adjustment, an airspeed sensor for determining an airspeed of the aircraft, a processor configured to receive the airspeed of the aircraft and flight path angle, to calculate a pitch angle saturation limit in response to the airspeed of the aircraft, to compare the sum of the pitch rate command, scaled pitch rate, and scaled pitch angle to the pitch angle saturation limit, and to apply limiting the pitch-up pitch rate command to generate a damped pitch angle response for the pitch angle command which is the pitch angle saturation limit. A flight control law is configured to control an aircraft control surface to control an aircraft pitch in response to the damped pitch angle command.

BRIEF DESCRIPTION OF DRAWINGS

The above-mentioned and other features and advantages of this invention, and the manner of attaining them, will become more apparent and the system and method will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of flight control systems, flight control algorithms, and aircraft are provided. In general, the disclosure herein describes a flight control system design to be used during the take-off phase of flight. During take-off, the pilot must accurately rotate the aircraft to a pitch attitude target without under or over-rotating. During takeoff, the pitch angle target limiting function is operative to limit the pilot pitch-up command in order to avoid putting the aircraft in a stall condition. This is particularly useful for use with a side stick control with a small-displacement pilot controller. A greater understanding may be obtained from reference to the drawings.

Figure 1:
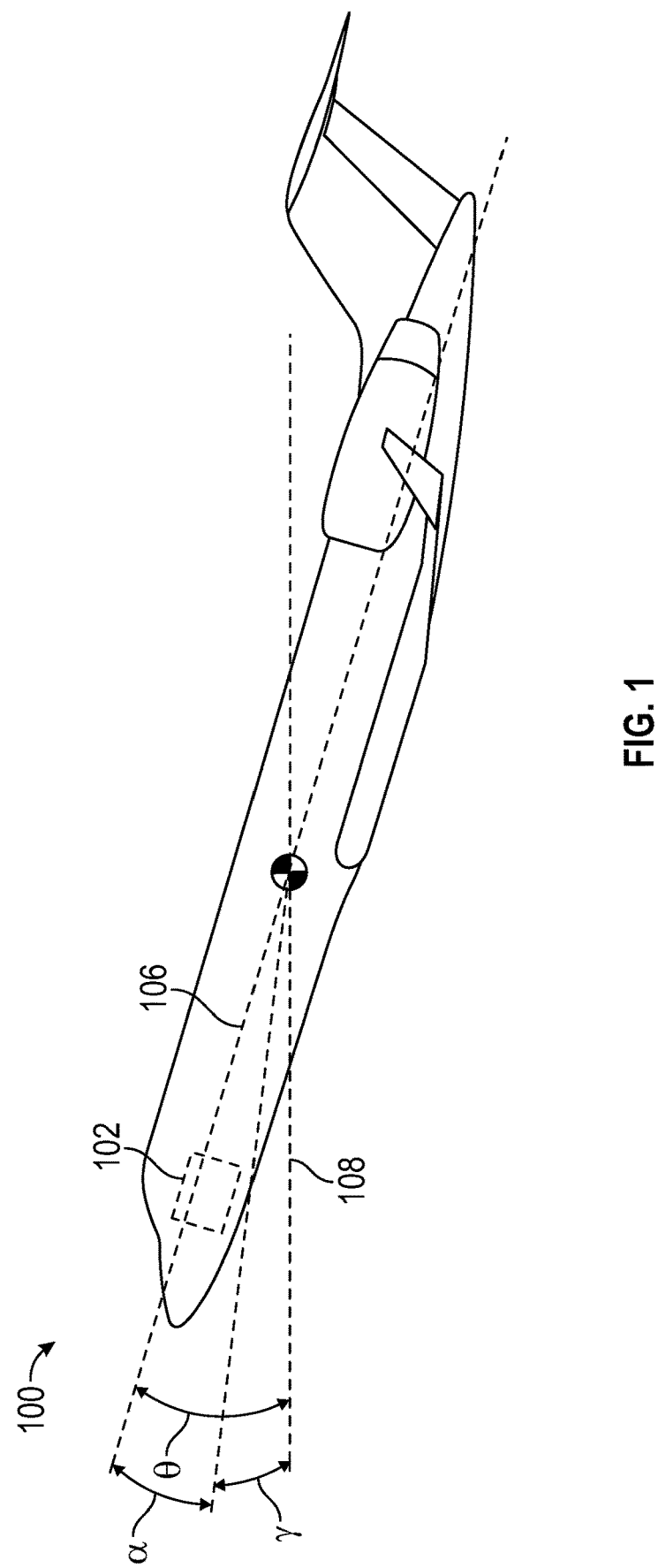
FIG. 1 is a simplified diagram illustrating a non-limiting embodiment of an aircraft in accordance with the teachings of the present disclosure.

FIG. 1 is a side view illustrating an aircraft 100 in flight. Aircraft 100 has a pitch attitude θ that indicates the longitudinal orientation 106 of aircraft 100 relative to a horizon 108, as will be appreciated by those with ordinary skill in the art. Aircraft 100 includes a flight control system 102 that performs various flight related tasks. Aircraft 100 has an angle of attack (α) that indicates the angle between flight path and longitudinal orientation. Aircraft 100 has flight path angle (γ) that indicates the angle between longitudinal orientation axis and flight path. At a slower takeoff speed, an increased pitch attitude θ results in a high angle of attack which increases lift from the aircraft wing, but may result in a reduction of acceleration which may result in an aircraft stall condition if the angle is higher than the stall angle.

Figure 2:
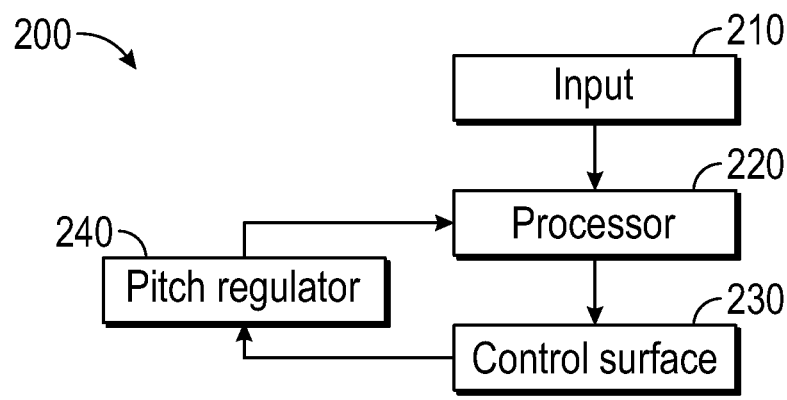
FIG. 2 is a simplified block diagram illustrating a non-limiting embodiment of a system for providing takeoff stall protection control in accordance with the present disclosure.

Referring now to FIG. 2, a block diagram illustrating a flight control system 200 for takeoff stall control in an aircraft according to an exemplary embodiment of the present disclosure is shown. The exemplary flight control system 200 includes an input 210, a processor 220, a control surface 230 and a pitch regulator 240. The exemplary flight control system 102 is operative to prevent over rotation of the aircraft during takeoff to reduce the risk of being in an aerodynamic stall condition. Typically, in-air stall protection control laws are not activated during aircraft liftoff while main landing gear are in contact with the ground in order to remove dependence of on-ground stall angle information which is required for reliable radar altitude. Furthermore, aerodynamic effects of the ground may adversely affect in-air stall protection control law computations thereby rendering these laws less effective.

The exemplary takeoff stall protection (TSP) is a pitch rate command system with pitch angle target limiting function to protect an aircraft from aerodynamic stall on-ground. The TSP control law may protect an aircraft from inadvertent over-rotation and aerodynamic stall during the takeoff phase without using radar altitude information in a fly by wire control system. The exemplary TSP system allows for consistent forces for normal takeoffs and full control authority to manage stabilizer mis-trims or control surface failures while preventing a rotation rate or pitch attitude that could lead to an aerodynamic stall on ground or immediately after lift-off before transitioning to the in-air alpha-limiting protection. TSP may transition to the normal in-air control law immediately or soon after lift-off.

In this exemplary embodiment, the input 210 may be an aircraft control column, or yoke, used to control the altitude of the aircraft. In an exemplary embodiment, the input 210 may be a side-stick controller usually located to the side of a pilot and is used to control the altitude of the aircraft in response to a fly by wire control system. One disadvantage of the side-stick configuration is that the controller is significantly shorter than a traditional center stick design and therefore has less range, or linear displacement, than a longer center stick and thus making small changes in elevation more difficult and thereby increasing the possibility of overshoot and or over rotation of aircraft when large motions are executed.

In an exemplary fly by wire system, the input 210 is operative to couple a pitch rate command indicative of a side stick displacement to a processor 220 indicative of the aircraft control stick position. Initially, the processor 220 may then be operative to couple a control signal indicative of the-pitch rate command, to the control surface controller 230 such as an elevator controller. The pitch regulator 240 is then operative to receive the pitch rate, pitch angle, and flight path angle from the control surface controller 230, aircraft sensor or associated control logic. The processor 220 may receive an airspeed indication from an aircraft sensor, global positioning system sensor, or the like. The processor 220 may then be operative to calculate a pitch angle saturation limit in response to a control surface position, aircraft airspeed, and/or flight path angle. If the sum of the pitch rate command, scaled pitch rate, and scaled pitch angle reaches a pitch angle saturation limit, the pitch regulator 240 is then operative to track the pitch rate command with the proportional and integral feedbacks of aircraft pitch rate to generate a pitch angle command. The pitch angle command is then coupled to the processor 220. In one exemplary embodiment, the pitch regulator factor is a set of values associated with an aircraft airspeed. For example, below 75 KCAS the pitch regulator factor may be 0, thereby a pilot stick position directly generates elevator command to pre-flight control surface check. Likewise, above 75 KCAS, the pitch regulator factor may be 1, thereby pilot stick input generates pitch rate command and the regulator process makes pitch rate of aircraft track to the pitch angle command and the pitch angle command is then coupled to the control surface controller 230 for pitch control of the aircraft control surface. The pitch angle command may further be generated in response to airplane state measurements, such as pitch angle, pitch rate, angle of attack, flight path angle, normal acceleration, and/or aircraft airspeed.

In an exemplary TSP, the input 210 is operative to generate a pitch rate command in response to a pitch stick deflection when the airspeed is higher than 75 KCAS. The processor 220 then tracks a pitch rate command while a pitch angle saturation limit function is not active. The pitch angle saturation limit is defined as:

$$\theta_{limit} = \tau_\theta * (\alpha_{1p0} - K_{const} + LF_\tau(0.3)*\gamma)$$

Where:
$\tau_\theta$ is a design parameter which represents a gain on pitch angle.
$\theta_{limit}$ is the pitch attitude limit which would provide adequate margin to stall in full ground effect assuming flight path (or runway slope) is zero.
$\gamma$ is the flight path angle.
$LF_\tau(0.3)$ is low path filter applied to γ with 0.3 sec time constant.
$\alpha_{1p0}$ is the angle of attack at normalized angle of attack 1.0. which is a function of aircraft speed, aircraft flap configuration and aircraft wing anti-ice function status. The reference 1.0 angle of attack is defined from free air stall angle of attack with 1 deg of margin to aero stall. The angle of attack may not be dependent on radar altitude value
$K_{const}$ is the constant value which is dependent on margin between free-air and in ground effect angle of attack which, in this exemplary embodiment, may be between 2 to 3 degrees.

When the sum of current pitch angle, current pitch rate times gain and pitch rate command are less than the saturation limit value, the pitch stick command directly commands pitch rate. When the sum is higher than the saturation limit value, the saturation limit value is commanded as pitch angle command. When the saturation is not active, proportional and integral gains are active to reduce the error between pitch rate command and the current aircraft pitch rate. In an exemplary embodiment, when the saturation is active, pitch rate command system may be converted to pitch angle target following system with extra pitch angle and pitch rate feedback. In addition, for a takeoff phase, flight path angle information is used to correct pitch attitude to approximate angle of attack but is also used to set the limit for removing dependence of radar altitude in TSP system.

In an exemplary embodiment, the TSP may be applied only during takeoff phase of the aircraft. After the aircraft altitude exceeds a predetermined level, such as after liftoff, 10 feet above the ground or the like, the TSP may be disabled and transitioned to in flight stall protection or nominal in-air flight control law. In addition, in an exemplary embodiment, the TSP may be enabled when one or more conditions are met, such as speed is greater than 75 knots calibrated air speed (KCAS), aircraft is on the ground, the flap handle is in the takeoff configuration, and/or the ground spoiler is not active. When an aircraft is landing and ground spoiler extended at the moment of touch down, TSP is not active, but a pitch damper is active.

Figure 3:
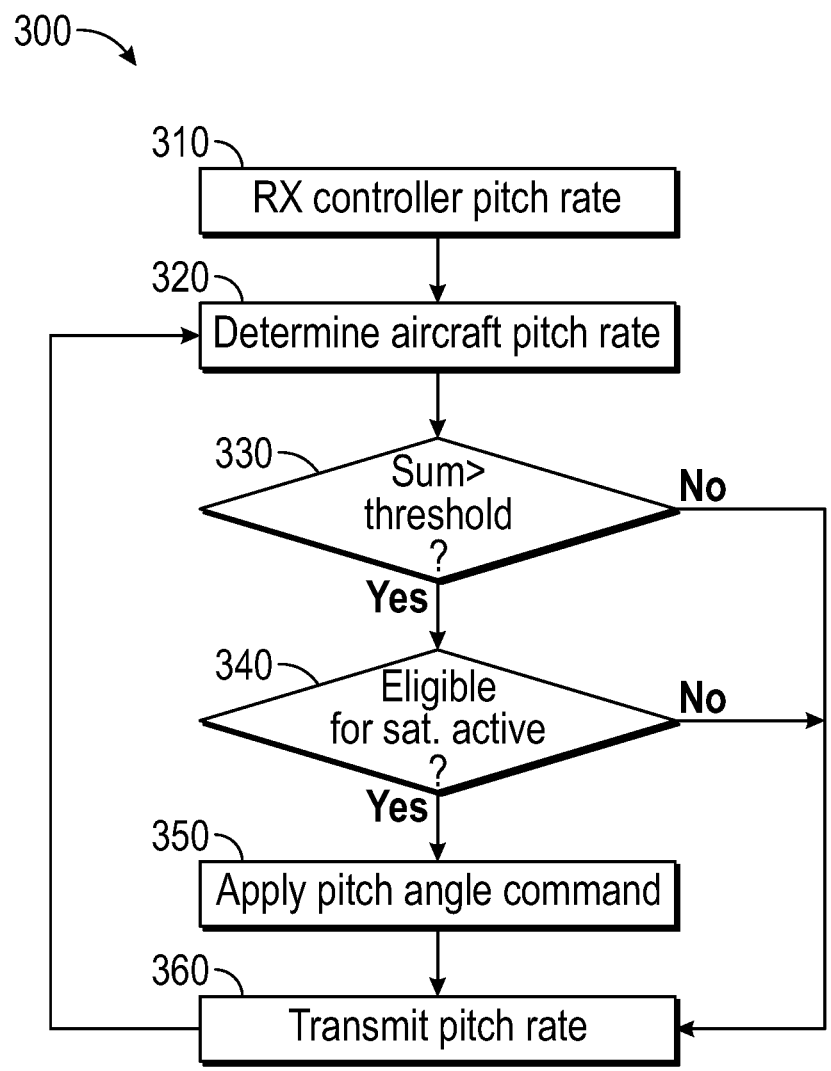
FIG. 3 shows a flow diagram illustrating a non-limiting embodiment of a method of providing takeoff stall protection control in accordance with the teachings of the present disclosure.

Turning now to FIG. 3, a flow diagram illustrating a non-limiting embodiment of a method 300 of providing takeoff stall control in accordance with the teachings of the present disclosure. The method is first operative to receive 310 a pitch rate command from an aircraft controller, such as a yoke, side stick, or the like, in response to a pilot action. For example, a pilot may pull back on a side stick thereby causing a displacement of the side stick indicative of a pitch rate. A pitch rate command is generated in response to the side stick displacement and the pitch rate command is then coupled to the aircraft control processor or the like. For example, the processor 220 may couple the pitch rate command to the aircraft control processor by sending an electronic data signal to the aircraft control processor.

The method is next operative to calculate a pitch angle saturation limit 320 from one or more aircraft sensors. The pitch angle saturation limit may be determined in response to normalized angle of attack, a function of aircraft speed, aircraft flap configuration and WAI status, flight path angle and/or predetermined pitch attitude limit.

The method is next operative to determine if the sum of the pitch rate command, scaled pitch rate and scaled pitch angle exceeds the pitch angle saturation limit. If the sum does not exceed the pitch angle saturation limit, the method is then operative to apply 360 the pitch rate command to the elevator controller, aircraft control surface controller, or the like.

If the sum does exceed the pitch angle saturation limit, the method is next operative to determine 340 if the sum is eligible for TSP 340. In an exemplary embodiment, the TSP may be applied only during takeoff of the aircraft. After the aircraft altitude exceeds a predetermined level, such as after liftoff or 10 feet or the like, the TSP may be disabled and transitioned to in flight stall protection or nominal flight control law. In addition, in an exemplary embodiment, the TSP may be enabled when one or more conditions are met, such as speed is greater than 75 knots calibrated air speed (KCAS), aircraft is on the ground the flap handle is in the takeoff configuration, and/or the ground spoiler is not active. If the sum is not eligible for TSP, the method is then operative to apply the pitch rate command to the elevator controller, aircraft control surface controller, or the like.

If the sum is eligible for TSP, the method is next operative to apply a regulator, or extra pitch damper, to convert the TSP to the pitch angle command 350. In one exemplary embodiment, when the saturation is active, the pitch rate command system is converted to a pitch angle limit system. The method is next operative to apply 360 the modified pitch rate command to the elevator controller, aircraft control surface controller, or the like.

Figure 4:
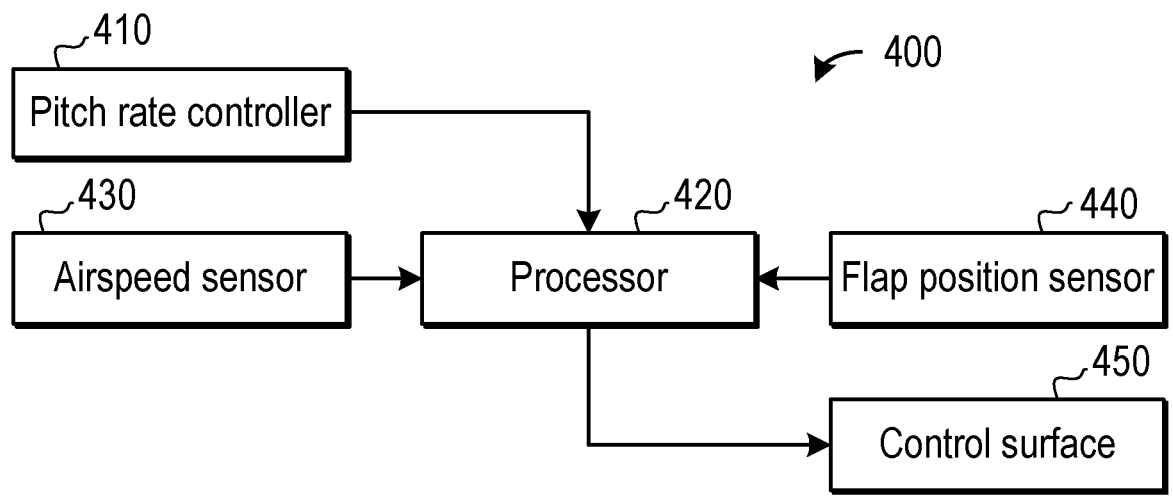
FIG. 4 is a simplified block diagram illustrating another non-limiting embodiment of a system for providing takeoff stall protection control in accordance with the present disclosure.

Turning now to FIG. 4, a block diagram illustrating a system 400 for takeoff stall control in an aircraft according to an exemplary embodiment of the present disclosure is shown. The exemplary system 440 may include pitch rate controller 410, a processor 420, an airspeed sensor 430, a flap position sensor 440, and a control surface.

The pitch rate controller 410 may be an input, such as an aircraft control column, a side stick controller, a yoke or the like configured to generate a pitch rate command in response to a pilot input, such as a deflection of the pitch rate controller 410 or the like. The pitch rate controller may be operative to generate the pitch rate command to be indicative of a direction and a degree of deflection of the pitch rate controller 410 and be further operative to couple the control signal to a processor 420 or aircraft controller or the like. In an exemplary embodiment, the pitch angle command is generated in response to a pilot generated deflection of the pitch rate controller and wherein the pitch rate controller is an aircraft control column.

The processor 420 is operative to receive the pitch rate command from the pitch rate controller 410 and to generate a control signal for coupling to the control surface 450 in order to control the pitch rate and other control aspects of the aircraft. In an exemplary embodiment, the processor 420 is operative to receive the pitch rate command from the pitch rate controller 410, to calculate a pitch angle saturation limit and to compare the sum of the pitch rate command, scaled pitch rate, and scaled pitch angle to the pitch angle saturation limit. In an exemplary embodiment, the pitch angle saturation limit is a safe aircraft pitch limit at a given airspeed selected to limit the risk of a stall event. The pitch angle saturation limit may be determined in response to an aircraft speed, an aircraft flight path angle and a free air stall angle of attack. If the sum exceeds the pitch angle saturation limit, indicating a potential stall risk, the processor 420 is then operative to regulate pitch angle and limit (damp) pilot pitch up pitch rate command. In an exemplary embodiment, when the saturation is active, the pilot pitch-up pitch rate command is nullified. When pilot inputs generate pitch-down pitch rate command enough to do that the sum is less than the saturation limit, the system is converted into the pitch rate command system. The process may further consider an aircraft flap configuration being in a takeoff condition.

The processor 420 is then operative to couple the damped pitch rate command to an aircraft control surface 450. The aircraft control surface 450 may be configured to adjust an aircraft control surface setting in response to damped pitch rate for regulating pitch angle. For example, the aircraft control surface 450 may be an elevator and may further include control circuitry or other controller and/or processor for adjusting the aircraft control surface, such as symmetric ailerons and/or elevator.

Figure 5:
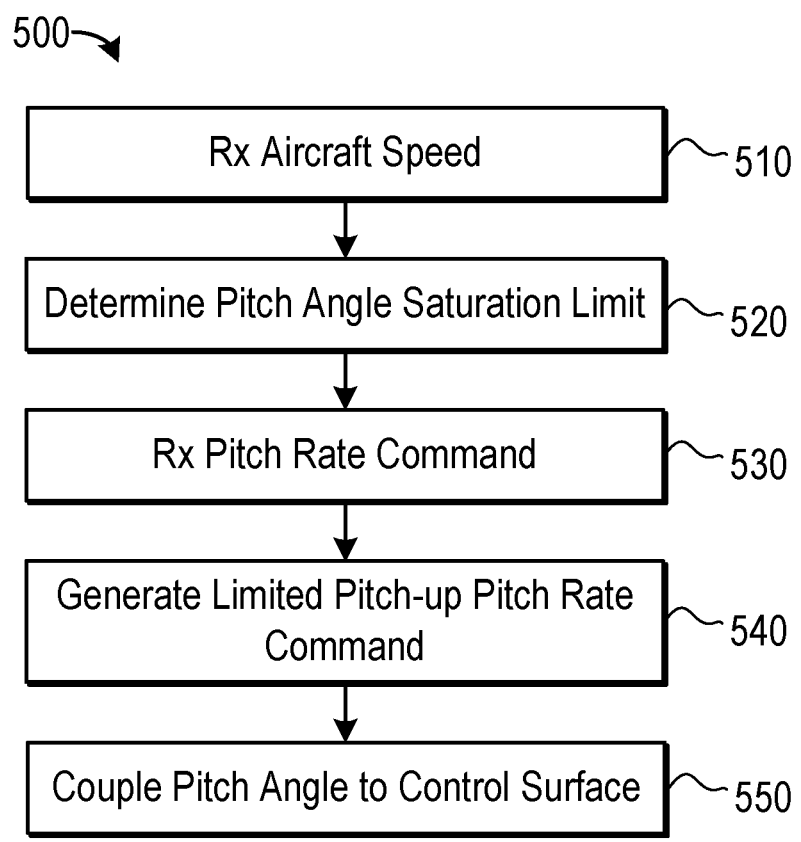
FIG. 5 shows a flow diagram illustrating another non-limiting embodiment of a method of providing takeoff stall protection control in accordance with the teachings of the present disclosure.

Turning now to FIG. 5, a flow diagram illustrating another non-limiting embodiment of a method 500 of providing takeoff stall control. The exemplary method for controlling an aircraft is first operative for receiving 510 an aircraft speed from an aircraft speed sensor.

The method is next operative for determining 520 a pitch angle saturation limit in response to the aircraft speed. The pitch angle saturation limit may also be determined in response to an aircraft flight path angle. In an exemplary embodiment, the pitch angle saturation limit is determined in response to an aircraft speed, an aircraft flight path angle and a free air stall angle of attack which may not be dependent or radar altitude value.

The method is next operative for receiving 530 a pitch rate command from an aircraft control system. In an exemplary embodiment, the aircraft control system is a side stick aircraft control column. Alternatively, the aircraft control system may be an aircraft control column, a yoke, control wheel or the like operative for piloting and controlling the attitude of the aircraft. The pitch rate command is representative of a degree of deflection of the aircraft control system in response to a pilot input. For example, a pilot pulling back on a side stick aircraft control column may result in a pitch rate command of +9 degrees/sec being coupled to an aircraft control processor or the like.

The method is next operative for generating 540 a limited pitch-up pitch rate command in response to the pitch angle saturation limit. If the sum of the pitch rate command, scaled pitch rate and scaled pitch angle exceeds the pitch angle saturation limit within the aircraft airspeed range at on-ground state, a regulator factor is applied to the pitch angle and pitch rate as additional feedback signals in order to convert the pitch rate command control law to a pitch angle tracking control law. In an exemplary embodiment, if the sum exceeds the pitch angle saturation limit, the pitch angle limit value, is equal to the pitch angle command. In this example, The control law is then active as the pitch angle command system in place of the pitch rate angle command. In an exemplary embodiment, the limited pitch up pitch rate command may be superposed for the pitch angle command and the regulator process make aircraft pitch angle to be tracked to the pitch angle command. In this example, when a pilot input generates pitch-down pitch rate command, the sum may be less than the saturation limit. The processor is converted to a pitch rate command system from a pitch angle command system. The processor generates the control surface command to track aircraft pitch rate to the pitch-down pitch rate command. The pitch angle command may further be generated in response to a takeoff condition indicator indicating that the aircraft is in a takeoff configuration. In another exemplary embodiment, the TSP is active in response to the aircraft speed exceeding seventy-five knots calibrated air speed.

The method is then operative for coupling 550 the pitch angle command to an aircraft control surface. The aircraft control surface is an elevator. In an alternative embodiment, the method may be operative for coupling the pitch angle command to the aircraft control surface in response to one control surface failure case, one elevator jammed or one elevator floating.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight control system for an aircraft comprising:
an input configured to generate a position signal in response to a pilot input; and
at least one processor operative to receive the position signal, the at least one processor operative to
calculate a pitch rate command in response to the position signal;
calculate a pitch angle saturation limit during takeoff based at least in part on
a flight path angle during takeoff, and
a stall angle of attack of the aircraft;
compare the pitch angle saturation limit during takeoff to a sum of
a scaled pitch angle,
a scaled pitch rate, and
the pitch rate command;
generate a damped pitch rate command by modifying the pitch rate command to limit an aircraft pitch attitude; and
generate a control signal from the damped pitch rate command when a sum of the scaled pitch angle, the scaled pitch rate, and the pitch rate command is greater than the pitch angle saturation limit during takeoff of the aircraft, the control signal for coupling to an aircraft control surface that is operative to alter the aircraft pitch attitude in response to the control signal.

2. The flight control system of claim 1 wherein the flight path angle is received from an aircraft sensor during takeoff and wherein the at least one processor is further operative to apply a low pass filter to the flight path angle to calculate the pitch angle saturation limit during takeoff.

3. The flight control system of claim 1 wherein the stall angle of attack is a free-air stall angle of attack, and wherein the at least one processor is operative to calculate the pitch angle saturation limit during takeoff further based on a margin between the free-air stall angle of attack and a ground effect stall angle of attack.

4. The flight control system of claim 1 wherein the pitch angle saturation limit is calculated to provide a margin to stall in full ground effect when a runway slope is zero.

5. The flight control system of claim 4 wherein the stall angle of attack is a free-air stall angle of attack, and wherein the pitch angle saturation limit is calculated as:

$$\theta_{limit} = \tau_\theta * (\alpha_{1p0} - K_{const} + LF_\tau(0.3) * \gamma),$$

where $\theta_{limit}$ is the pitch angle saturation limit, $\tau_\theta$ is a gain factor, $\alpha_{1p0}$ is the free-air stall angle of attack that is normalized, $K_{const}$ is a margin between the free-air stall angle of attack and a ground effect stall angle of attack, $LF_\tau(0.3)$ is a low pass filter applied with a 0.3 second time constant, and $\gamma$ is the flight path angle during takeoff.

6. The flight control system of claim 5 wherein the aircraft pitch attitude is limited to not exceed the pitch angle saturation limit ($\theta_{limit}$).

7. The flight control system of claim 1 wherein the at least one processor is further operative to stop generating the control signal from the damped pitch rate command in response to aircraft altitude exceeding a predetermined level after takeoff.

8. The flight control system of claim 1 wherein the at least one processor is further operative to stop generating the control signal from the damped pitch rate command in response to liftoff.

9. The flight control system of claim 1 wherein the input is a side stick aircraft control.

10. The flight control system of claim 1 wherein the aircraft control surface is an elevator.

11. An aircraft comprising:
an input configured to generate a position signal in response to a pilot input;
an aircraft control surface operative to alter an aircraft pitch attitude in response to a control signal; and
at least one processor operative to receive the position signal, the at least one processor operative to
calculate a pitch rate command in response to the position signal;
calculate a pitch angle saturation limit during takeoff based at least in part on
a flight path angle during takeoff, and
a stall angle of attack of the aircraft;
compare the pitch angle saturation limit during takeoff to a sum of
a scaled pitch angle,
a scaled pitch rate, and
the pitch rate command;
generate a damped pitch rate command by modifying the pitch rate command to limit the aircraft pitch attitude; and
generate the control signal from the damped pitch rate command to alter the aircraft pitch attitude when a sum of the scaled pitch angle, the scaled pitch rate, and the pitch rate command is greater than the pitch angle saturation limit during takeoff of the aircraft.

12. The aircraft of claim 11 wherein the flight path angle is received from an aircraft sensor during takeoff and wherein the at least one processor is further operative to apply a low pass filter to the flight path angle to calculate the pitch angle saturation limit during takeoff.

13. The aircraft of claim 11 wherein the stall angle of attack is a free-air stall angle of attack, and wherein the at least one processor is operative to calculate the pitch angle saturation limit during takeoff further based on a margin between the free-air stall angle of attack and a ground effect stall angle of attack.

14. The aircraft of claim 11 wherein the pitch angle saturation limit is calculated to provide a margin to stall in full ground effect when a runway slope is zero.

15. The aircraft of claim 14 wherein the stall angle of attack is a free-air stall angle of attack, and wherein the pitch angle saturation limit is calculated as:

$$\theta_{limit} = \tau_\theta * (\alpha_{1p0} - K_{const} + LF_\tau(0.3)*\gamma),$$

where $\theta_{limit}$ is the pitch angle saturation limit, $\tau_\theta$ is a gain factor, $\alpha_{1p0}$ is the free-air stall angle of attack that is normalized, $K_{const}$ is a margin between the free-air stall angle of attack and a ground effect stall angle of attack, $LF_\tau(0.3)$ is a low pass filter applied with a 0.3 second time constant, and $\gamma$ is the flight path angle during takeoff.

16. The aircraft of claim 15 wherein the aircraft pitch attitude is limited to not exceed the pitch angle saturation limit ($\theta_{limit}$).

17. The aircraft of claim 11 wherein the at least one processor is further operative to stop generating the control signal from the damped pitch rate command in response to aircraft altitude exceeding a predetermined level after takeoff.

18. The aircraft of claim 11 wherein the at least one processor is further operative to stop generating the control signal from the damped pitch rate command in response to liftoff.

19. The aircraft of claim 11 wherein the input is a side stick aircraft control and wherein the aircraft control surface is an elevator.

20. An aircraft comprising:
a stick input configured to generate a position signal in response to a pilot input;
an elevator control surface operative to alter an aircraft pitch attitude in response to a control signal; and
a processor operative to receive the position signal, the processor operative to
calculate a pitch rate command in response to the position signal;
calculate a pitch angle saturation limit during takeoff based at least in part on
a free-air stall angle of attack of the aircraft,
a low pass filtered measurement of a flight path angle during takeoff, and
a margin between the free-air stall angle of attack of the aircraft and a ground-effect stall angle of attack of the aircraft;
compare the pitch angle saturation limit during takeoff to a sum of
a scaled pitch angle of the aircraft during takeoff,
a scaled pitch rate of the aircraft during takeoff, and
the pitch rate command calculated in response to the position signal;
generate a damped pitch rate command by modifying the pitch rate command to limit the aircraft pitch attitude; and
generate the control signal from the damped pitch rate command and couple the control signal to the elevator control surface to alter the aircraft pitch attitude when a sum of the scaled pitch angle, the scaled pitch rate, and the pitch rate command is greater than the pitch angle saturation limit during takeoff of the aircraft, otherwise generate the control signal from the pitch rate command during takeoff.

* * * * *